United States Patent [19]

Marchionda

[11] 4,243,087

[45] Jan. 6, 1981

[54] SELF-ADJUSTING TIRE CHAIN

[76] Inventor: Tony Marchionda, 708 Fifth St., Struthers, Ohio 44471

[21] Appl. No.: 57,984

[22] Filed: Jul. 16, 1979

[51] Int. Cl.³ .............................................. B60C 27/10
[52] U.S. Cl. ...................................... 152/218; 152/231
[58] Field of Search ................... 152/225 C, 218, 217, 152/231, 241, 213 R, 208, 182; D12/154

[56] References Cited

U.S. PATENT DOCUMENTS

| | | | |
|---|---|---|---|
| 1,473,797 | 11/1923 | Seruis et al. | 152/217 |
| 2,820,502 | 1/1958 | Spencer | 152/218 |
| 3,020,948 | 2/1962 | Branitzky | 152/241 |
| 3,031,000 | 4/1962 | Sebena | 152/218 |
| 3,827,473 | 8/1974 | Buckensderfer et al. | 152/218 |
| 3,913,651 | 10/1975 | Stonack | 152/213 R |
| 4,173,244 | 11/1979 | Schultz | 152/218 |

*Primary Examiner*—Michael G. Wityshyn
*Attorney, Agent, or Firm*—Webster B. Harpman

[57] ABSTRACT

A self-adjusting easy on tire chain for use on automotive or similar vehicle tires consists of a chain having a spacing and alignment bar with a fastener for securing the chain in the proper position on a tire.

4 Claims, 4 Drawing Figures

SELF-ADJUSTING TIRE CHAIN

BACKGROUND OF THE INVENTION (1) Field of the Invention

This invention relates to tire chains for automotive vehicles or the like for increasing traction on slippery surfaces such as snow or mud.

(2) Description of the Prior Art

Prior tire chains have generally comprised a chain configuration having a number of cross members and usually a pair of perimeter extending support elements. See for example U.S. Pat. Nos. 1,473,797; 2,820,502 and 3,020,948.

In U.S. Pat. No. 1,473,797 a conventional tire chain is disclosed having a pair of parallel support chains and a plurality of cross connecting chains over the tread portion of the tire.

In U.S. Pat. No. 2,820,502 an anti-skid device is disclosed wherein a triangular support member holds three chains in spaced relation over the tread portion of the tire in connection with an inverted U-shaped support bracket affixed to the opposite side of the tire.

In applicant's device a single length of metal chain is attached midway from its ends to an adjustable turn buckle and the sections spaced in relation to each other by a bracket of a fixed length, the free ends of the chain are then placed over the tire and are secured to the free end of the turn buckle.

In U.S. Pat. No. 3,020,948 an anti-skid device is shown having three separate short lengths of chain which are positioned over the tire tread and secured thereto by fasteners to a pair of straps on the other side of the tire forming a triangularly shaped support and tread crossing positions evenly spaced from one another.

Applicant's invention has a single length of chain arranged in an unique X-shaped configuration crossing the tire tread in spaced relation to one another by use of a spacing bracket.

SUMMARY OF THE INVENTION

A self-adjusting tire chain for automotive vehicles or the like comprises a length of chain secured midway from its ends to a turn buckle. A spacing bracket holds the chain end portions in spaced relation to one another as they pass over the tread portion of the tire. The turn buckle also engages the two free ends of the chain and secures the chain assembly on the tire.

DESCRIPTION OF THE PREFERRED EMBODIMENT

Figure 1:
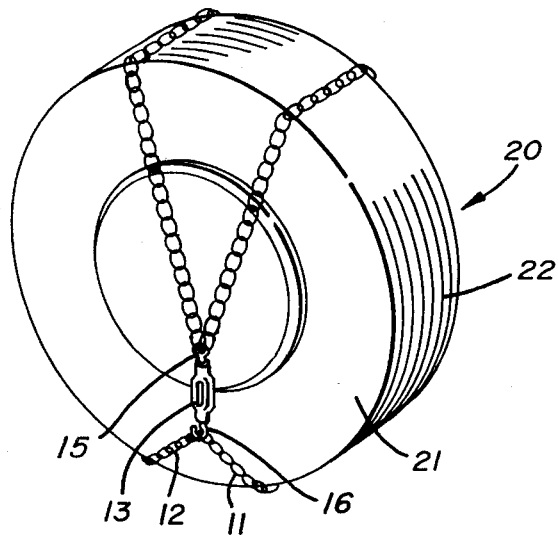
FIG. 1 is a perspective view of the self-adjusting tire chain on a tire.

In the form of the invention chosen for illustration herein, the self-adjusting tire chain comprises, as may best be seen in FIG. 1 of the drawings, a single length of chain 10 having ends 11 and 12 with an adjustable turn buckle 13 secured at a point 14 midway from said respective ends 11 and 12. The turn buckle 13 has a pair of oppositely disposed threaded parts 15 and 16, each of which has a hook-like configuration and is adjustable within the turn buckle 13 in opposite threaded apertures therein. The part 15 of the turn buckle 13 engages the midsection of the chain 10 while the part 16 is attached to both of the chain ends 11 and 12.

Figure 2:
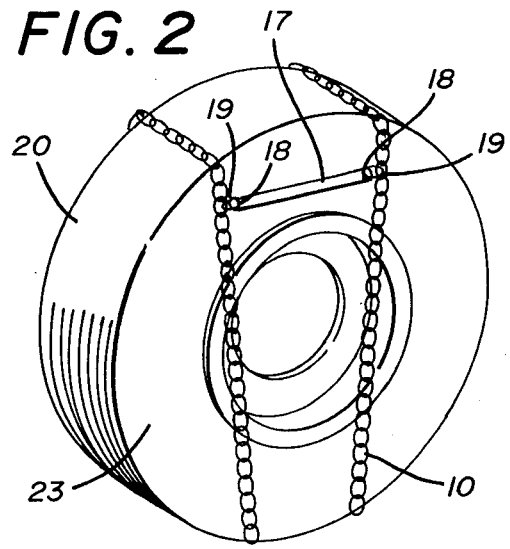
FIG. 2 is a rear perspective view of the tire chain on a tire.
Figure 4:
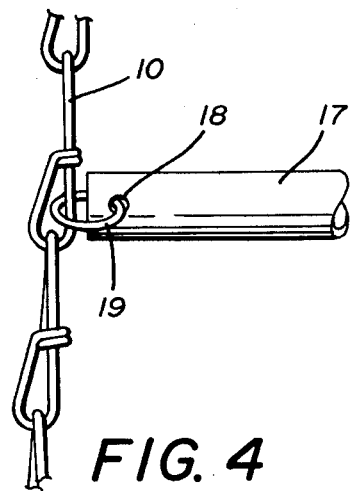
FIG. 4 is an enlarged view of a portion of the device.
Figure 3:
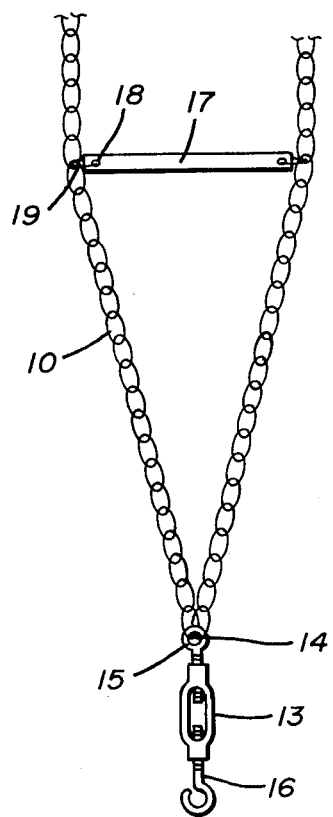
FIG. 3 is a front elevation of the device.

As seen in FIG. 2 of the drawings, an elongated spacing member 17 has a pair of oppositely disposed apertures 18 in its ends. A pair of chain links 19 are positioned through said oppositely disposed apertures 18 and said length of chain 10 midway between each of the ends 11 and 12 and the turn buckle 13 thereby holding sections of the chain 10 in spaced relation as will best be seen in FIGS. 3 and 4 of the drawings.

Referring now to FIGS. 1 and 2 of the drawings, a tire 20 is shown having a front 21, an annular tread portion 22 and a back 23. In use the self-adjusting tire chain is positioned by placing the chain ends 11 and 12 over the top of the tread 22 and down the back side 23 of the tire 20 on either side of an axle (not shown). The ends 11 and 12 are then pulled across the bottom of the tread 22 and up the front side 21 of the tire 20 and both chain ends are secured to the part 16 of the turn buckle 13 which draws the chain together by rotating the body section of the turn buckle 13. The tire chain 10 having been secured on the tire 20 adjusts itself by moving to proper alignment as the tire moves allowing for maximum spacing between the chain sections as they pass over the tread 22, increasing the traction and friction co-efficient between the tire 20 and the road surface.

It will thus be seen that a self-adjusting tire chain has been disclosed which can be easily and quickly mounted on a tire for additional traction in snow or mud.

Although but one embodiment of the present invention has been illustrated and described, it will be apparent to those skilled in the art that various changes and modifications may be made without departing from the spirit of the invention and having thus described my invention,

What I claim is:

1. A tire chain for a vehicle wheel and tire consisting of a single length of chain formed of a plurality of interconnected links and having two ends, an adjustable fastener attached to said single length of chain in the middle portion thereof, a spacing member and means on its ends attaching it to said chain at points spaced with respect to said adjustable fastener so that the parts of the chain between said fastener and said spacing member may be positioned over said tire, the two ends of said chain being releaseably attached to said adjustable fastener, the arrangement positioning the parts of the chain inwardly of the ends thereof under said tire and in oppositely disposed relation to said parts of the chain positioned over said tire.

2. The tire chain of claim 1 and wherein said adjustable fastener is a turn buckle.

3. The tire chain of claim 1 and wherein said spacing member is an elongated body member.

4. The tire chain of claim 1 and wherein the chain is of a length more than double the combined diameter and width of said wheel and tire and the fastener is attached thereto midway between the ends of the chain and to the ends thereof.

* * * * *